United States Patent
Brüll et al.

(10) Patent No.: US 9,576,047 B2
(45) Date of Patent: Feb. 21, 2017

(54) METHOD AND SYSTEM FOR PREPARING A PLAYLIST FOR AN INTERNET CONTENT PROVIDER

(71) Applicant: Panasonic Automotive Systems Company of America, Division of Panasonic Corporation of North America, Peachtree City, GA (US)

(72) Inventors: Philipp Brüll, Berlin (DE); Arthur Taylor, Berlin (DE); Chris Dawes, Cobham (GB); Marcelo Diniz, Berlin (DE)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 236 days.

(21) Appl. No.: 14/467,975

(22) Filed: Aug. 25, 2014

(65) Prior Publication Data

US 2015/0058367 A1 Feb. 26, 2015

(30) Foreign Application Priority Data

Aug. 26, 2013 (EP) .................................. 13004198

(51) Int. Cl.
*G06F 17/30* (2006.01)
*H04L 29/08* (2006.01)
(Continued)

(52) U.S. Cl.
CPC .. *G06F 17/30699* (2013.01); *G06F 17/30386* (2013.01); *H04H 20/82* (2013.01);
(Continued)

(58) Field of Classification Search
CPC ......... G06F 17/30023; G06F 17/30657; G06F 17/30899; G06F 17/30017; G06F 17/30699;
(Continued)

(56) References Cited

U.S. PATENT DOCUMENTS

| 8,983,805 | B2* | 3/2015 | Rameau | .................. G06F 17/50 345/629 |
| 2002/0032019 | A1* | 3/2002 | Marks | ............... G06F 17/30017 455/414.1 |

(Continued)

OTHER PUBLICATIONS

Written Opinion issued on Aug. 21, 2015 by International Preliminary Examining Authority, European Patent Office for PCT/US2014/05279; pp. 1-10.

(Continued)

*Primary Examiner* — Anh Ly
(74) *Attorney, Agent, or Firm* — Laurence S. Roach

(57) ABSTRACT

A computer implemented method is for generating a media playlist including a plurality of tracks to be played on a listener's mobile or stationary client device with Internet radio capabilities, the client device intended to be connected to the Internet. The method comprises: obtaining, as a listener's input into the listener's client device, a playlist definition; selecting, from a plurality of tracks, tracks meeting the playlist definition to form the playlist, wherein the playlist is formed by playlist entries that include track identifications referring to selected ones of the plurality of tracks; tracks present in a remote master media inventory, tracks present in an Internet-based cloud memory environment, and tracks present in a local media content inventory of the listener's client device form the plurality of tracks; selecting tracks that meet the playlist definition includes comparing the playlist definition with entries for tracks in a metadata encyclopedia which includes metadata derived (Continued)

from a master metadata encyclopedia referring to the tracks present in the remote master media inventory and the tracks present in the cloud memory environment, and the local media content inventory kept in the local listener's client device; the metadata encyclopedia is kept locally in the client device; and each entry in the local metadata encyclopedia refers to a respective track and includes at least one track descriptor and at least one similarity data descriptor; and providing the playlist to the listener's client device for obtaining the tracks indicated on the playlist for playing the tracks in the playlist in an order defined in the playlist.

20 Claims, 4 Drawing Sheets

(51) Int. Cl.
*H04L 29/06* (2006.01)
*H04H 20/82* (2008.01)
*H04H 60/06* (2008.01)
*H04H 60/46* (2008.01)
*H04H 60/73* (2008.01)

(52) U.S. Cl.
CPC ............ *H04H 60/06* (2013.01); *H04H 60/46* (2013.01); *H04H 60/73* (2013.01); *H04L 65/60* (2013.01); *H04L 67/10* (2013.01); *H04L 67/22* (2013.01)

(58) Field of Classification Search
CPC .......... G06F 17/30386; G06Q 30/0269; G06Q 30/0273; H04W 88/06; H04H 40/90; H04L 65/60; H04L 67/2842; H04L 67/10; H04L 67/22; H04N 9/8715; H04N 5/765; H04N 5/783; G11B 20/0869; G11B 27/34; G11B 27/10
See application file for complete search history.

(56) References Cited

U.S. PATENT DOCUMENTS

| | | | | |
|---|---|---|---|---|
| 2003/0135513 | A1* | 7/2003 | Quinn | G06F 17/30743 707/E17.014 |
| 2004/0002310 | A1 | 1/2004 | Herley et al. | |
| 2005/0039206 | A1* | 2/2005 | Opdycke | G06Q 30/02 725/35 |
| 2006/0059535 | A1 | 3/2006 | D'Avello | |
| 2007/0061835 | A1* | 3/2007 | Klein, Jr. | H04N 7/17354 725/25 |
| 2007/0067309 | A1* | 3/2007 | Klein | G06F 17/30017 707/E17.009 |
| 2007/0239781 | A1 | 10/2007 | Kraft et al. | |
| 2008/0188209 | A1* | 8/2008 | Dorogusker | G06Q 30/0241 455/414.2 |
| 2009/0059512 | A1* | 3/2009 | Lydon | G06F 17/30053 361/679.41 |
| 2009/0171715 | A1* | 7/2009 | Conley | G06F 17/30053 705/14.73 |
| 2009/0276317 | A1* | 11/2009 | Dixon | G06Q 10/087 705/14.61 |
| 2010/0082731 | A1 | 4/2010 | Haughay et al. | |
| 2011/0125297 | A1 | 5/2011 | Chu et al. | |
| 2011/0295843 | A1* | 12/2011 | Ingrassia, Jr. | G06F 17/30053 707/723 |
| 2012/0266076 | A1* | 10/2012 | Lockhart | G06F 17/30017 715/738 |
| 2013/0031162 | A1* | 1/2013 | Willis | H04L 67/02 709/203 |
| 2014/0075308 | A1* | 3/2014 | Sanders | G06F 17/30772 715/716 |
| 2015/0058473 | A1* | 2/2015 | Grande | H04W 64/00 709/224 |
| 2016/0191583 | A1* | 6/2016 | Lockhart | H04L 65/60 709/231 |

OTHER PUBLICATIONS

Communication issued on Nov. 27, 2013 by European Patent Office enclosing European Search Report for EP Application No. 13004198.1; pp. 1-9.

PCT International Search Report issued on Nov. 5, 2014 by European Patent Office for PCT Application No. PCT/US2014/052679; pp. 102.

* cited by examiner

METHOD AND SYSTEM FOR PREPARING A PLAYLIST FOR AN INTERNET CONTENT PROVIDER

CROSS-REFERENCE TO RELATED APPLICATION

This application claims priority to European Application Serial Number 13 004 198.1, filed on Aug. 26, 2013, the disclosure of which is hereby incorporated by referenced in its entirety for all purposes.

BACKGROUND OF THE INVENTION

Internet radio is an audio service to distribute audio content via the Internet to individual consumers. Today, music is the most popular type of audio content that is distributed. However, news, weather information, audio books, spoken commentaries, e-learning content, or the like are also offered on the Internet to an audience or a community of listeners. This is sometimes referred to as webcasting since it is not transmitted broadly and directly to its listeners through wireless means only.

Similar to traditional radio broadcasting, Internet radio involves streaming media, which is presenting listeners with a continuous stream of audio that cannot be paused or replayed by a listener. In this respect, it is distinct from on-demand file serving. Internet radio is also distinct from podcasting individual content, which involves downloading rather than streaming. Many Internet radio services are associated with a corresponding traditional (terrestrial) radio station or radio network. Internet-only radio stations are independent of such associations.

While Internet radio services are usually accessible from anywhere in the world, some stations and networks restrict listening to within the country. Internet radio services offer news, sports, talk, and various genres of music, such as Blues, Classical, Country, Easy Listening, Electronic, Folk, Jazz, Latin, Metal, Pop, R&B and Urban, Rap, Reggae, Rock, or others, in a similar manner as they are available on traditional radio stations.

Streaming technology is used to distribute audio content that is encoded. Streaming audio coding formats include MP3, Ogg Vorbis, Windows Media Audio, RealAudio, or others. Audio data is continuously transmitted serially (streamed) over the local network or Internet in TCP or UDP packets, then reassembled at the receiver and presented to the listener. Most stations stream their content at data rates between 64 kbit/second and 128 kbit/second, providing near CD quality audio.

Currently known Internet radio stations such as Pandora, geographically restricted to the U.S., rely solely on an analysis of music by musician-analysts that have been listening to music song by song in order to analyze and collect musical details on every track such as melody, harmony, instrumentation, rhythm, vocals, lyrics etc. Based on, e.g., a name of a song, artist or genre entered by a user, the database is scanned to include tracks with musical similarities in a playlist. The tracks of that playlist will then be streamed to the listener's Internet device (desktop, laptop, or tablet computer, smartphone, e-book with Internet access, or the like).

Growing media libraries are more and more difficult to effectively manage. Music playlists are one way to effectively manage and filter certain songs by selecting groupings of songs for ordered playback. While handcrafting a playlist typically involves the tedious process of searching through a list of media to find appropriate songs and selecting the desired songs, music playlists can also be automatically generated based on common music track attributes, such as genre, artist, album, and the like. These automatically generated playlists, while simple and fast to create, usually result in playlists with low acceptance by listeners. Further, such automatic methods assume that all relevant track attributes are available and accurate for each piece of media. One way of generating automatic playlists involves a user to specify search criteria, adds songs matching the search criteria to the playlist, and automatically updates the playlist as songs meet the criteria. However, even these playlists are limited by a user's musical familiarity, library, and skill in crafting an effective playlist.

A main drawback of conventional media playlist generation is determining which media items are similar to one another by one or more aspects. When handcrafting a playlist the user is responsible for drawing similarities between several different media items. Media similarity data and, more specifically, media playlists based on media similarity data are known in the art. Systems using similarity data for this purpose identify characteristics within each track and identify those tracks as being similar. Automated playlist generators rely on criteria such as melody, harmony, instrumentation, rhythm, vocals, lyrics etc. to build playlists, but these criteria are often too broad. Media by the same artist or even of the same type or genre is often not similar enough to generate a desirable playlist, i.e., where the listener's preferences are adequately taken into account. Some playlists try to solve some of these problems based on more detailed characteristics of the media, but they do not account for human preferences that are not easily definable.

As media libraries grow and digital media players are available with ever increasing capacities, these problems with playlists are likely to be exacerbated. Accordingly, what is needed in the art is an improved method of generating similarity data between media files and using such data for creating and managing playlists. However, in the rapidly growing number of Internet radio stations, currently known solutions are found to be inadequate to generate sufficiently attractive playlists of content. Therefore, the reach of each Internet radio station can be quite limited in the future due to its lack of focus on its listener community.

Problem

In order to operate an attractive Internet radio with a large listener base, it was found that listener focused track playlists should be created in an efficient manner.

Present Solution

In order to solve this problem, especially with restricted hardware (processor and memory) resource available in mobile devices, the present solution is comprised of a computer implemented method for generating a media playlist including a plurality of tracks to be played on a listener's client device with Internet radio capabilities, the client device being intended to be connected to the Internet. The present solution suggests the following steps:

As a listener's input into the listener's client device, a playlist definition is obtained. From a plurality of tracks, tracks meeting the playlist definition are selected to form the playlist. The playlist is formed by playlist entries that include track identifications referring to selected ones of the plurality of tracks. The plurality of tracks are either tracks present in a remote master media inventory, or tracks present in an Internet-based cloud memory environment, or tracks present in a local media content inventory of the listener's client device, or a combination thereof. Selecting tracks that meet the playlist definition includes comparing the playlist definition with entries for tracks in a metadata encyclopedia which includes metadata derived from either a master metadata encyclopedia referring to the tracks present in the remote master media inventory and the tracks present in the cloud memory environment, or the local media content inventory kept in the local listener's client device, or a combination thereof. The metadata encyclopedia is kept locally in the client device. Each entry in the local metadata encyclopedia refers to a respective track and includes at least one track descriptor and at least one similarity data descriptor. The playlist is provided to the listener's client device for obtaining the tracks (media items) indicated on the playlist for playing the tracks in the playlist in an order defined in the playlist.

An attractive content playlist, as it can be created by the present solution, appeals a listener because it contains tracks that meet his/her playlist definition. In addition, such an attractive content playlist contains a scalable number of tracks that are unknown but attractive to the listener in view of his preferences indicated by his/her playlist definition in order to widen the listener's horizon and exposure to tracks possibly unknown to him/her.

Advantages and Variations

The present solution, unlike presently available Internet radio providers, allows for creating personalized Internet radio track playlists for users based on details of a user's request, the current configuration of the system, and data stored in a system database. The present solution is also capable of including appropriate additional audio content, such as news and weather, spoken recordings, or the like in the list of music tracks at specified time intervals. Other Internet radio providers such as we7, Last.fm, deezer, Juke, MOG, simfy, Napster, Rdio and Spotify operate with a focus on streaming "radio-like" content while failing to stream personalized content. Basically, and in contrast thereto, the present solution provides for a channelization of the streamed content where the number of channels may be as large as the number of listeners active at any given time.

This solution provides listeners with a uniquely personalized content experience. In addition, this technology is highly scalable and flexible to allow continuous expansion of the content offering from a multi-format, multi-channel and multi-content platform. It creates an end-to-end service that enables users to access personalized content on any and each of the connected devices they use (e.g. desktop, laptop, or tablet computer, smartphone, e-book with Internet access, TV, in-vehicle-infotainment platform, etc.). This solution provides listeners with a cost efficient and predictable access to content. It may satisfy the demand arising from the growth in mobile communications market, digital music and streaming consumption. The increasing connected car development sees more and more customers to demand for audio content and all-time connectivity in automobiles. Especially the connected cars market is expanding rapidly where a growing number of web radio and other connected applications are implemented and integrated into in-car entertainment systems.

As the local metadata encyclopedia in the client device relies on various internal and external sources, its contents can be tailored to the specific demands of the listener in view of the available hardware resources. That is to say that the local metadata encyclopedia can be fed with data relevant for the respective user with only a fraction of the master metadata encyclopedia referring to the tracks present in the remote master media inventory and the tracks present in the cloud memory environment. The relevance of the data can be determined by analyzing the listener inputs over a time.

The features and advantages of the concepts may be realized and obtained, for example, by means of the instruments and combinations particularly pointed out in the appended claims.

The listener's input into the listener's client device to obtain a playlist definition may include explicit user preference information; listener's past listening behavior; mood-, genre-, and theme-based input, or a combination of the above.

The track descriptors may include one or more of the following: name of a track, artist or genre, melody, harmony, instrumentation, rhythm, vocals, lyrics etc., and wherein the similarity data descriptors include one or more of the following: how similar is a certain artist to another one, how similar is a certain track to another one, or how similar is the instrumentation of a certain track to the instrumentation of a certain track to another one.

The metadata encyclopedia may include: computer-software-generated track-to-track similarity coefficients; computer-software-generated artist-to-artist similarity coefficients; explicit user preference information; listener's past listening behavior; existing mood-, genre-, and theme-based reference playlists; computer-software-generated content-based track annotations based on mood, genre, etc., editorial track annotations, or a combination of the above.

The playlist definition may be either chosen from a predefined set of playlist definitions or created by a listener, and includes "User Station", "Artist Station", "Broadcast Station", "Mood/Genre Station" and/or "Listener's Station".

A computer software implemented rule engine may create a playlist in accordance with the listener's playlist definition by executing a series of operations on an initially empty list. The operations may include: "Add", "Fill", "Insert", "Block", "Choose", "Limit", "Move" and/or "Mutate and Score".

The rule engine may be programmed and adapted to perform filter functions to the track insertion process as tracks are added to the present playlist. If any particular filter function is saturated, subsequent track additions that would also fall into the criteria of that filter function may not be inserted into the present playlist. The filter functions include: "Artist saturation filter", "Album saturation filter", "Track saturation filter" and/or "Artist block".

A configuration file may be used to specify which sequence of operations is to be performed for generating a specific playlist. The operations may include: "block_artist", "add_artists_of_same_broadcast_station_or_artist_ recommendations_depending_on_source_flag", "fill_with_artist_recommendations", "fill_with_associated_artist_tracks", "fill_with_genre_tracks", "fill_with_random_broadcast_station_tracks", "mutate_and_score", "unblock_artist", "insert_artist_at_top", "insert_spoken_content" and/or "insert_preroll".

Prior to providing the playlist to a streaming engine, the playlist may be displayed to the listener, who may then be offered the choice to (i) skip tracks or (ii) rate tracks with "Love" and "Ban" buttons on the Internet media player device.

The listener's input and his behavior with respect to tracks that are presented to him may be entered into the local media encyclopedia for the respective track. The listener's input and his behavior may be uploaded for being processed as an entry to the main media encyclopedia.

A predetermined first number of high level classifiers for each of the tracks referred to in the master media encyclopedia may be combined to a predetermined second, lower number of low level features which may be stored as entries in the local media encyclopedia or in the master media encyclopedia.

The high level classifiers may be extracted from the tracks, the listener/editor entries may be added and both are then compiled into the local and/or the master metadata encyclopedia. The similarity of tracks, albums and artists may be calculated and stored in the master metadata encyclopedia.

The rule engine may be trained with editor made reference lists for each classification.

The metadata generated in the listener's client device relative to each classification may be fed to the master metadata encyclopedia where it may be correlated with corresponding feedback from other listeners' client devices.

The metadata may include relationship patterns between tracks in the local or the master metadata encyclopedia. The rule engine may assign tracks with similar features to each other, and the rule engine may perform a rule-based analysis of the metadata to generate the playlist.

The rule engine may perform a rule-based analysis and assignment of listeners' inputs and behavior. The result of the rule-based analysis and assignment of at least a majority of the individual listeners may be compiled and fed into the master metadata encyclopedia.

The local metadata encyclopedia in the listener's client device may be updated by metadata from the master metadata encyclopedia in order to receive media item similarity ratings in the local metadata encyclopedia that have been compiled based on cumulative data collected from a plurality of participants, editors and/or have been computer generated.

The compilation of the similarity ratings and the listeners' behavior may include processing the cumulative data in a host's online data processing center.

The steps of (i) receiving, in the listener's client device, the similarity ratings for a plurality of the individual media items contained in the listener's media library, and (ii) generating the media playlist may include individual media items contained in the listener's media library and which have a similarity rating relative to a seed media item selected from the participant's (listener's or user's) media library.

The steps of selecting the seed media item may include manipulating a touchscreen on the listener's client device using sweeping finger gestures to scroll through a list of media items displayed on the touchscreen until a desired seed media item is displayed, and then selecting the seed media item by touching and releasing the seed media item.

In the rule engine, the client device's user's listening preferences and compiled playlists may form individual radio programs for each listener. Such playlists may include music tracks, audio books, business background features, language courses, news & weather.

A computer-readable media may be provided with computer-executable instructions or data structures stored thereon to execute the method defined above.

A client device may include a memory to store the local metadata encyclopedia and a plurality of tracks or media items, a human-machine interface to receive the playlist definition or the seed media item as the listener's input into the listener's client device, and a processor to execute the method defined above.

BRIEF DESCRIPTION OF THE DRAWINGS

In order to best describe the manner in which the above described solutions may be implemented, as well as define other advantages and features of above described solutions, a more particular description is provided below and is illustrated in the appended drawings.

Understanding that these drawings depict only exemplary embodiments of the solutions and are not therefore to be considered to be limiting in scope, the examples will be described and explained with additional specificity and detail through the use of the accompanying drawings in which.

DETAILED DESCRIPTION

Figure 1:
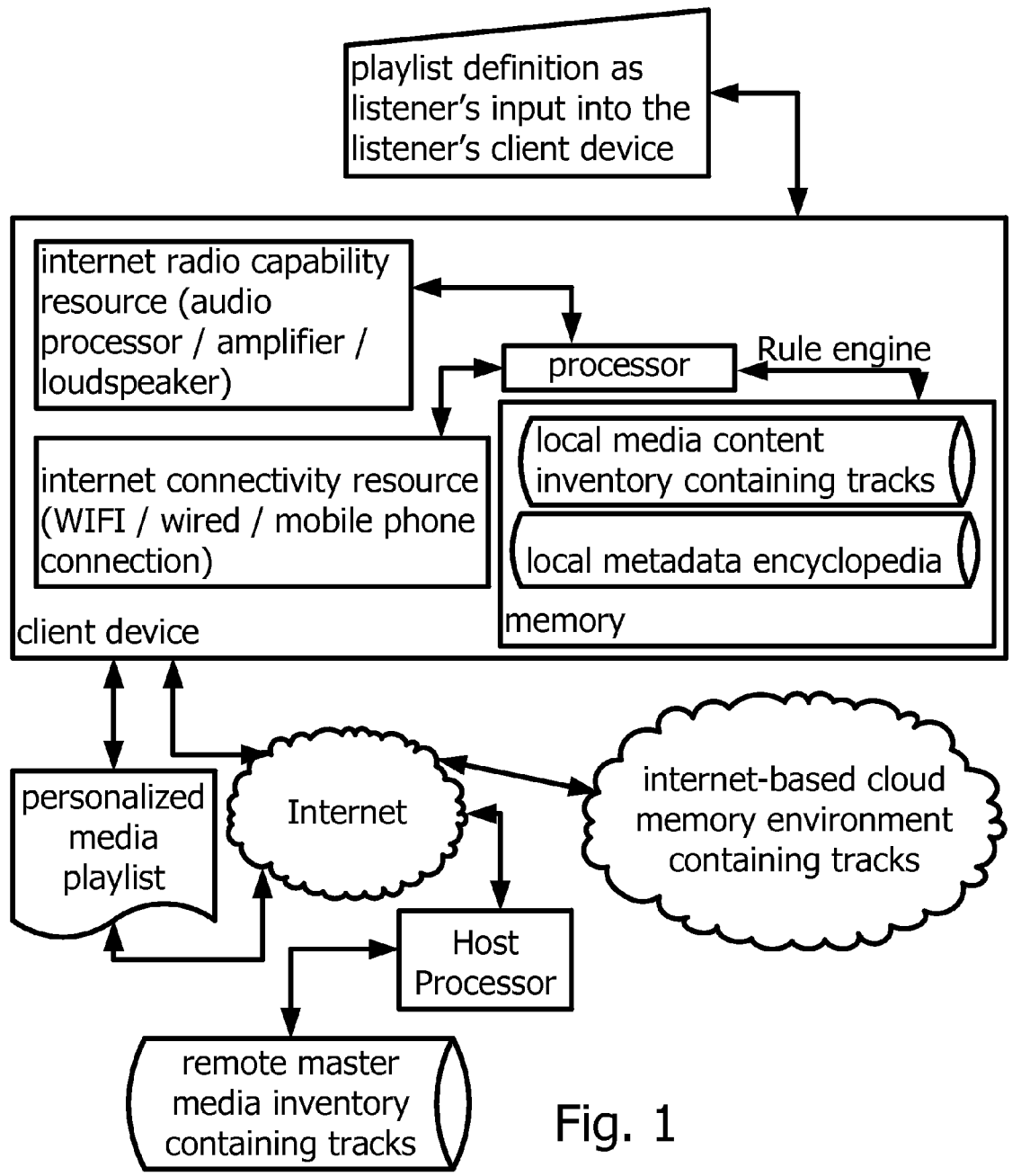
FIG. 1 illustrates a schematic overview of the system architecture involved in generating a personalized media playlist.

The present solution, as generally shown in FIG. 1, provides methods and arrangements for facilitating Internet radio playlist generation for a listener based at least in part on media library inventory information provided by a number of sources. In this context, an exemplary program or system in which the individuals (listeners) are participating is an Internet radio station to which listeners can subscribe as "premium users" or simply receive the content stream for free. Listeners participating in the present system have access to and control over a stationary or mobile device with Internet radio capabilities. A master media inventory can be maintained in a single host environment or in an Internet cloud environment from which its content is streamed to the listeners in accordance with the/their playlist(s). A track that is only available in the master media inventory may be streamed to the listener's device if that track is on the listener's playlist. Alternatively, the listener's device is provided with a URL (unique resource locator) of a specific track, and the listener's device has access to the track in order to receive it as a stream or download and play it. In addition, the playlist can also include one or more tracks present in the memory of the listener's client device.

Figure 2:
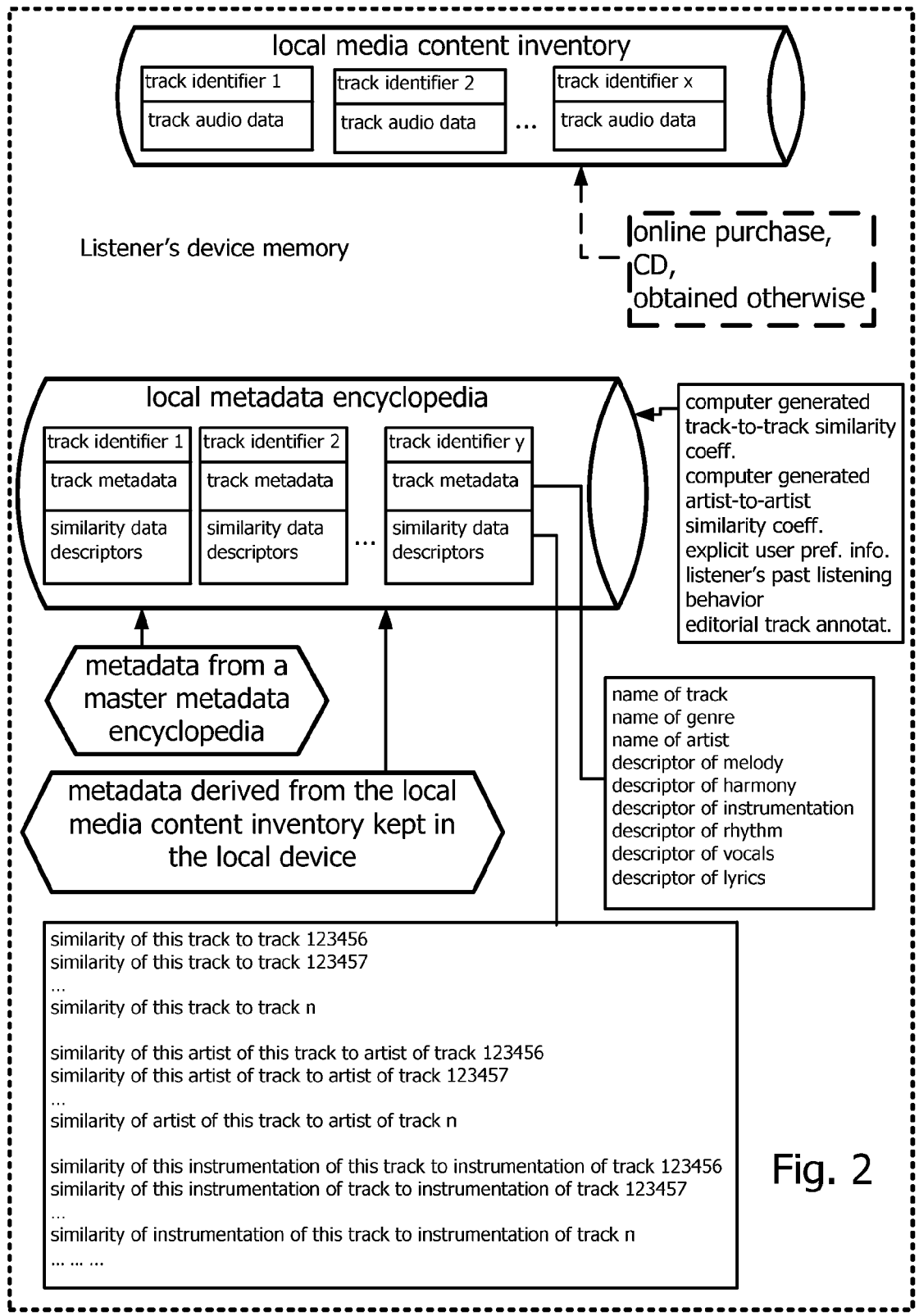
FIG. 2 illustrates a schematic overview of the listener's device memory organization and content.

In addition, as generally shown in FIG. 2, listeners that participate in the present system have access to and control over a stationary or mobile storage client device in which they maintain a local media content inventory. Alternatively, the stationary or mobile device with Internet radio capabilities may include a mobile storage device in which local media content inventory is maintained. The local content in the local inventory is pre-processed in the local device to provide a local metadata encyclopedia representative of that listener's media inventory. In addition or in lieu thereof, the local content in the local inventory is pre-processed in a central host processor to provide a metadata encyclopedia that is the completely or partially downloaded to the listener's locally kept media inventory. This metadata may contain identification data of the individual tracks (e.g., songs) presently contained in that local content inventory regardless of its origin. That is to say, the tracks may have been purchased (online), added from a CD or otherwise obtained and included in the listener's library or local content inventory maintained in the listener's client device.

A first part of the metadata in the local metadata encyclopedia can be derived via an online connection from a master metadata encyclopedia maintained and enriched centrally. A second part of the local metadata encyclopedia includes metadata derived from the local media content inventory kept in the local listener's client device or accessible by the device (e.g., via memory extensions of the local device). Both the local and the master metadata encyclopedia maintain characteristics about a large number of tracks. In order to access a track in the listener's inventory, the track may be identified through its track identifier.

Figure 3:
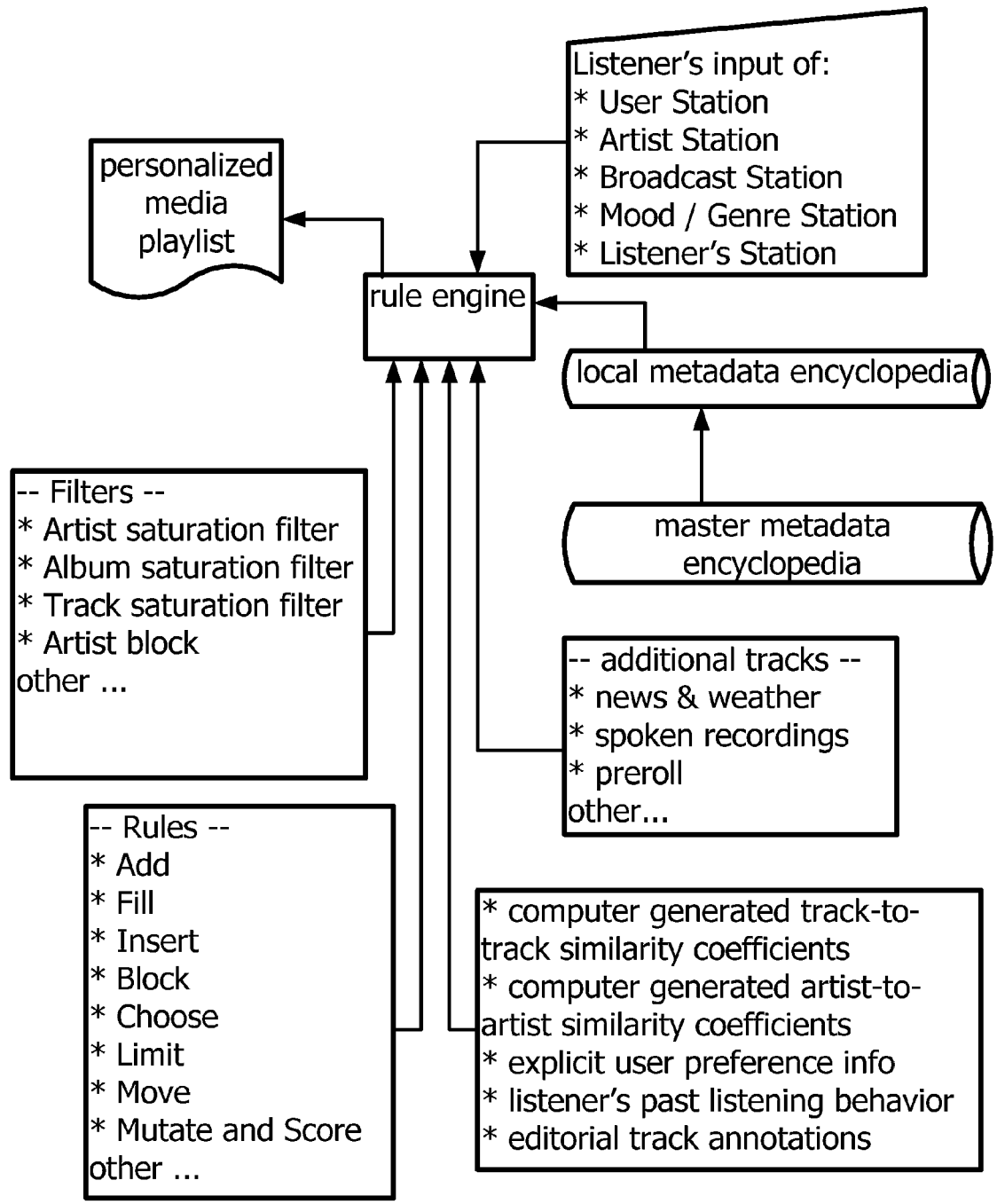
FIG. 3 illustrates an overview of the functionality of the rule engine, the rules applied and the data used for generating the personalized media playlist.

For each of the tracks, the track identifier also enables access to respective characteristics of that track in the metadata encyclopedia. As generally shown in FIG. 3, each entry in the metadata encyclopedia refers to a certain track which can be described by metadata including a descriptor of one or more of the following: name of a track, artist or genre, melody, harmony, instrumentation, rhythm, vocals, lyrics, etc. Additionally, or in lieu of the afore-mentioned descriptors, the metadata can also include a list of similarity data descriptors such as how similar is a certain artist to another one, or how similar is a certain song to another one, or how similar is the instrumentation of a certain song to the instrumentation of another song.

To populate the metadata encyclopedia, the present solution relies on data from a number of different sources:

TABLE 1

| | |
|---|---|
| computer-software-generated track-to-track similarity coefficients | they can, e.g., be obtained by a software package called SoundsLike by the Fraunhofer Gesellschaft. |
| computer-software-generated artist-to-artist similarity coefficients | they can, e.g., be obtained by a software package called SoundsLike by the Fraunhofer Gesellschaft. |
| explicit user preference information | a listener has, e.g., assigned "love" or "ban" to a track. |
| listener's past listening behavior | has "has skipped a specific track" or "has listened to the complete track". |
| existing mood-, genre-, and theme-based reference playlists | |
| computer-software-generated content-based track annotations based on mood, genre, etc. | they can, e.g., be obtained by a software package called xproex by the Fraunhofer Gesellschaft. |
| editorial track annotations | |

In order to create a playlist, a listener may choose from a predefined set of playlist definitions or create his/her own playlist definitions. The set of playlist definitions may include:

TABLE 2

| | |
|---|---|
| "User Station" | This playlist definition primarily includes tracks that the user has 'love'd in previous listening sessions. |
| "Artist Station" | This playlist definition primarily includes tracks from a selected artist and similar artists. |
| "Broadcast Station" | This playlist definition primarily includes tracks associated with a specific theme, style, or period in musical history. |
| "Mood/Genre Station" | This playlist definition primarily includes tracks matching a user-selected mood, genre, subgenre, or combination thereof. |
| "Listener's Station" | This playlist definition primarily includes tracks that meet a specific definition, e.g. "early Rock 'n Roll", or "French Romantic composers performed by the London Symphonic Orchestra conducted by Daniel Baarenboim" |

Once the listener has chosen a playlist definition, the present solution creates a playlist in accordance with that definition by a rule engine executing a series of operations on an initially empty list (see also FIG. 3). The combination of these operations builds a personalized playlist based on the listener's request. Categories for these rules are:

TABLE 3

| | |
|---|---|
| Add | Insert seed tracks into the playlist, based on the selected station type. |
| Fill | Insert the bulk of the tracks for the station, based on the tracks already added and the selected station type. |
| Insert | Insert specific additional audio content, such as news and weather, spoken recordings, or the like, or a start track for a selected artist's station. |
| Block | Prevent insertion of tracks matching some predefined criteria. |
| Choose | Insert one track selected at random from a group of tracks. |
| Limit | Remove tracks from the playlist, whose inclusion would exceed limits of tracks for a specific predefined criterion. |
| Move | Reorganize tracks within the playlist |
| Mutate and Score | Shuffle the playlist a predefined number of times, generating a "quality" rating for each permutation based on certain predefined criteria, and select the highest quality permutation. |

Within each category of these rules, there may be one or more implementations of the station operation. The station operations to be executed may be selected based on the current configuration.

In order to comply with broadcast licensing restrictions, or for other reasons, a filter with certain criteria is applied to the track insertion process. The filter may be characterized by details of the recent listening behavior of the user. As tracks are added to the playlist by means of the station operations, the filter is updated with details of the added tracks. If any particular filter is saturated, subsequent track additions that would also fall into the criteria of that filter may not be added. Example filters include:

TABLE 4

| | |
|---|---|
| Artist saturation filter | To avoid playing more than a particular number of tracks from any one artist in a given period. |
| Album saturation filter | To avoid playing more than a particular number of tracks from any one album in a given period. |
| Track saturation filter | To avoid repetitions of the same track in a given period. |
| Artist block | To prevent tracks from a selected artist being inserted. |

The present solution accepts, e.g., text-based configuration files to specify which sequence of Station Operations should be performed for specific Station Types. For example, the playlist generation for the Artist Station could be described as:
"Artist Station"

TABLE 5

| Operation | description of operation |
|---|---|
| block_artist | Prevents any tracks from the selected artist from being inserted. |
| add_artists_of_same_ broadcast_station_or_ artist_recommendations_ depending_on_source_ flag | Adds tracks from artists similar to the selected artist, where similarity is determined either by Fraunhofer similarity coefficients, editorial similarity coefficients, or co-membership of an editorial playlist depending on the system configuration. |
| fill_with_artist_ recommendations | If the playlist not already full, adds tracks from artists similar to the selected artist, where similarity is determined by Fraunhofer or editorial similarity coefficients. |

TABLE 5-continued

| Operation | description of operation |
|---|---|
| fill_with_associated_artist_tracks | If the playlist not already full, adds tracks from artists similar to the selected artist, where similarity is determined by Fraunhofer or editorial similarity coefficients. |
| fill_with_genre_tracks | If the playlist not already full, adds tracks whose genre matches the dominating genre of the playlist. |
| fill_with_random_broadcast_station_tracks | If the playlist not already full, adds tracks from a previously generated Broadcast Station's playlist. |
| mutate_and_score | Repeatedly shuffles the playlist, scores the resulting permutation for a predefined quality criterion and selects the highest quality permutation. |
| unblock_artist | Removes the restriction on the insertion of tracks from the selected artist. |
| insert_artist_at_top | Inserts a single track from the selected artist at the top of the playlist. |
| insert_spoken_content | Inserts spoken recordings into the playlist as required. |
| insert_preroll | Inserts a pre-roll track at the start of the playlist as required. |

The process of generating a personalized playlist involves the following steps:

The listener selects a playlist definition (see, e.g., Table 2 supra) or enters a new playlist definition. Then, the system generates the playlist and provides it to the streaming engine which then streams the tracks to the listener's Internet media player device. In a variation of the present solution, prior to providing the playlist to the streaming engine, it is displayed to the listener who then may also skip tracks or rate them with "Love" and "Ban" buttons on the Internet media player device.

Every listener's input ("Love" and "Ban") and his/her behavior with respect to tracks that are presented to him/her (e.g., skip/play completely, play a track with high or low volume) is entered into the local media encyclopedia for the respective track. In a variation of this solution, the listener's input and/or behavior can also be uploaded for being processed as an entry to the main media encyclopedia. Thereby, over time the present solution learns exactly who likes which tracks in order to improve the quality of the playlists generated for its listeners.

Each track is analyzed to populate the main media encyclopedia with media data of the tracks that are available for being presented to listeners of the present solution.

This solution creates an ever evolving unique user experience where music discovery is woven into playlists tailored to each listener's preferences.

The present solution bridges the gap between music owned by listeners on their various personal inventory, which does not promote discovery, and mass-market broadcast radio, which is not personalized. This may enables listeners to keep control over what they want to listen to and how they share it. The present solution uses a large number of high level classifiers, which are combined to approximately ten low-level features which are stored in the database as entries of a similarity matrix based on the high level extracted physical/acoustic features such as rhythm, melody, mood, style, sub-style, tempo, instrumentation, voice, etc.

Figure 4:
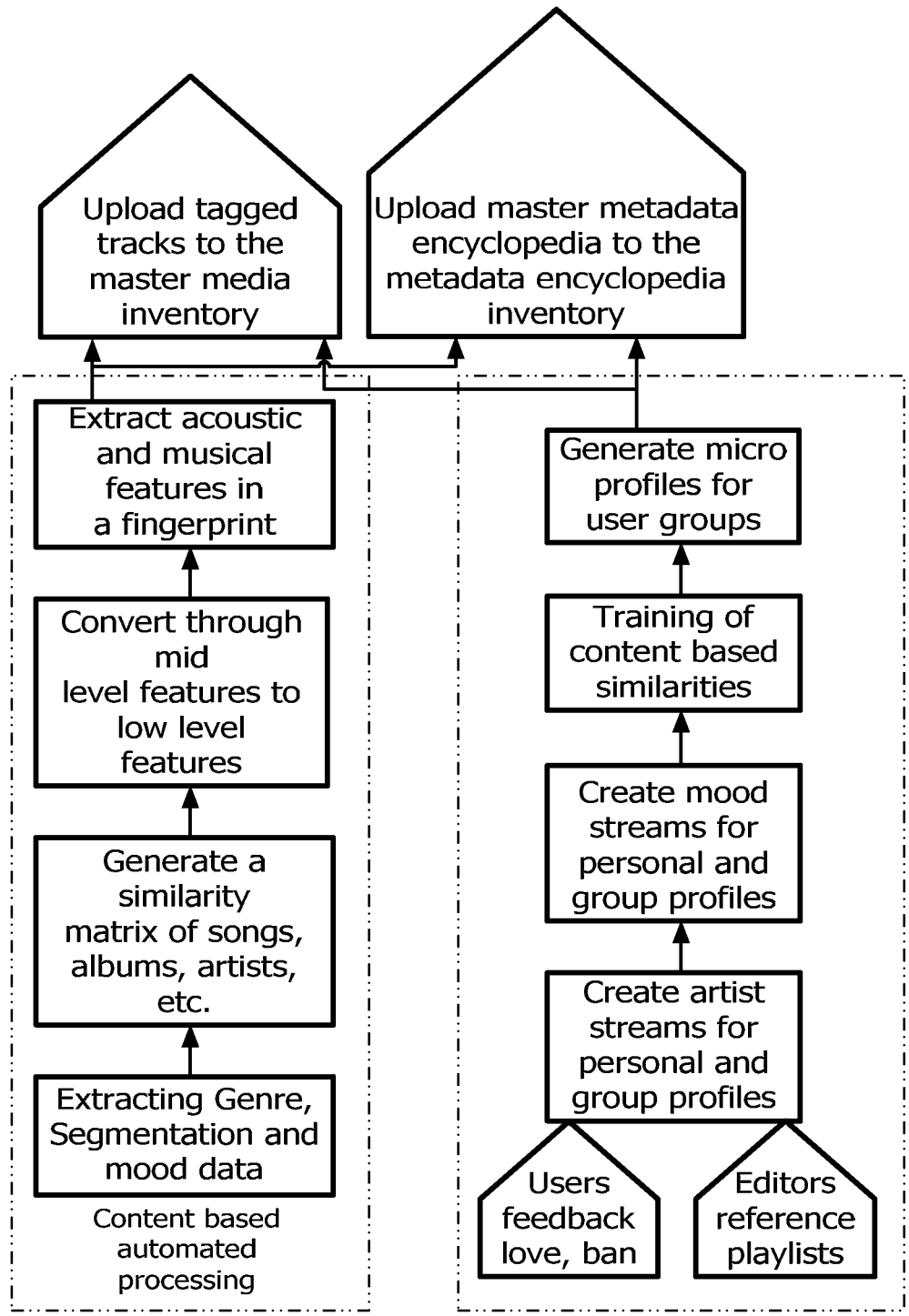
FIG. 4 illustrates an overview of the process for preparing and uploading tagged tracks to the master media inventory and generating the entries of the master metadata encyclopedia and uploading the master metadata encyclopedia to the metadata encyclopedia inventory.

As generally shown in FIG. 4, the present solution extracts these high level classifiers from the tracks and/or adds the listener/editor entries and compiles them into the local and/or the master metadata encyclopedia. The high-level features may be combined with so-called low level features, which can be understood and interpreted via databases and editors. The present solution may calculate the similarity from tracks, albums and artists, which is stored in that master metadata encyclopedia to be used for recommendations and personalization. Besides that, the present solution may also annotate the mood and genre etc. (viz. supra) which also uses the segmentation information. The present solution uses a rule engine that itself can also be trained with so-called editor made reference lists for each genre, mood, etc. classification. All new tracks are passed through this process, so that all new tracks and results can be accessed via the local and/or the master metadata encyclopedia. The metadata generated in the listener's client device relative to each classification (e.g., track, artist or genre, mood, melody, harmony, instrumentation, rhythm, vocals, lyrics, etc.) can also be fed to the master metadata encyclopedia where it is correlated with corresponding feedback from other listeners. Thus, the master metadata encyclopedia is maintained and enriched centrally in order to be distributed as future versions of the first part of the metadata in the listener's local metadata encyclopedia.

The present solution forms relationship patterns with other pieces of music in the local and/or the master metadata encyclopedia, assigning tracks with similar features (e.g., musical features) to each other. An analysis of the metadata (e.g., track, artist or genre, melody, harmony, instrumentation, rhythm, vocals, lyrics, etc. in addition to the various similarity relations) may be material in providing a listener-targeted playlist.

In order to be meaningful, the analysis and assignment of listeners' inputs and behavior is compiled from at least a majority of the individual listeners. In this way, individual playlists can be generated based on data input drawn from a large body of listeners.

In this present solution, the listener's client device receives media item similarity ratings that have been compiled based on cumulative data collected from a plurality (two or more) of participants, editors and/or have been computer generated. The cumulative data comprises identification data of individual media items contained in media libraries of each of the listeners. In this regard, a primary differentiator between the media items, i.e., tracks processed by the present solution and conventionally available media inventories, is the amount and quality of descriptive and identifying metadata associated with each item.

The compilation of the similarity ratings, the listeners' behavior, etc. includes processing the cumulative data which is exemplarily executed by the present solution host's online data processing center.

Similarity ratings are received by the listener's client device for a plurality of the individual media items contained in the listener's media library. Based thereupon, a media playlist is generated that includes individual media items contained in the listener's media library and which have a similarity rating relative to a seed media item selected from the participant's media library, typically by the listener.

The seed media item selection can be affected by manipulating a touchscreen on the listener's client device using sweeping finger gestures to scroll through a list of media items displayed on the touchscreen until a desired seed media item is displayed, and then selecting the seed media item by touching and releasing the seed media item.

The personalized playlist is then generated on the listeners' client device which may take the form of a portable personal media playing device or a personal computer, among others.

The present solution recognizes its users' listening preferences and compiles playlists forming individual radio programs for each listener. Such playlists may include music tracks, audio books, business background features, or the like. Audio books and language courses enable the integration of international audio books and podcasts into various hardware products, whereby titles are accessible for download and streaming. News and weather can also be provided as personalized news and weather via a text-to-speech engine.

The present solution offers a personalized experience for each of its listeners. Unlike traditional radio stations that broadcast the same content to all of their listeners, the present solution enables each of their listeners to create several personalized stations.

Embodiments within the scope of the present solution may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer executable instructions also include program modules that are executed by digital processors or signal processors in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

A reader skilled in the art will appreciate that other embodiments may be practiced in network computing environments with many types of computer system configurations, including personal computers, hand-held devices, multiprocessor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. Communication at various stages of the described system can be performed through a network cloud such as a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed to limit the invention. For example, the principles herein may be applied to an online store accessible wirelessly by a portable media playback device or by a personal computer physically connected to a network. Those skilled in the art will readily recognize various modifications and changes that may be made to the present solution without following the example embodiments and applications illustrated and described herein, and without departing from the true spirit and scope of the present disclosure.

The invention claimed is:

1. A computer implemented method for generating a media playlist including a plurality of tracks to be played on a listener's mobile or stationary client device with Internet radio capabilities, the client device intended to be connected to the Internet, the method comprising:

obtaining, as a listener's input into the listener's client device, a playlist definition;

selecting, from a plurality of tracks, tracks meeting the playlist definition to form the playlist, wherein the playlist is formed by playlist entries that include track identifications referring to selected ones of the plurality of tracks;

wherein the plurality of tracks comprises at least one of (i) tracks present in a remote master media inventory, (ii) tracks present in an Internet-based cloud memory environment, and (iii) tracks present in a local media content inventory of the listener's client device: wherein the step of selecting tracks that meet the playlist definition includes comparing the playlist definition with entries for tracks in a metadata encyclopedia which includes metadata derived from (i) a master metadata encyclopedia referring to the tracks present in the remote master media inventory and the tracks present in the cloud memory environment, and (ii) the local media content inventory kept in the local listener's client device; wherein the metadata encyclopedia is kept locally in the client device, and wherein each entry in the local metadata encyclopedia refers to a respective track and includes at least one track descriptor and at least one similarity data descriptor;

providing the playlist to the listener's client device for obtaining the tracks indicated on the playlist for playing the tracks in the playlist in an order defined in the playlist;

wherein the track descriptors Include one or more of the following: a name of a track, artist or genre, melody, harmony, instrumentation, rhythm, vocals, or lyrics, wherein the similarity data descriptors include one or more of the following: how similar is a certain artist to another one, how similar is a certain track to another one, or how similar is the instrumentation of a certain track to the instrumentation of another one;

wherein the metadata encyclopedia includes:
 computer-software-generated track-to-track similarity coefficients;
 computer-software-generated artist-to-artist similarity coefficients;
 explicit user preference information;
 listener's past listening behavior;
 existing mood-, genre-, and theme-based reference playlists;

computer-software-generated content-based track annotations based on at least one of mood, genre, and editorial track annotations;

wherein the playlist definition is either chosen from a predefined set of playlist definitions or created by a listener, and includes at least one of "User Station", "Artist Station", "Broadcast Station", "Mood/Genre Station" and "Listener's Station";

wherein the rule engine creates a playlist in accordance with the listener's playlist definition by executing a series of operations on an initially empty list, said operations including at least one of: "Add", "Fill", "Insert", "Block", "Choose", "Limit", "Move" and "Mutate and Score";

wherein the rule engine is programmed and adapted to perform filter functions to the track insertion process as tracks are added to the present playlist, where, if any particular filter function is saturated, subsequent track additions that also fall into the criteria of that filter function are not inserted into the present playlist, said filter functions including at least one of: "Artist saturation filter", "Album saturation filter", "Track saturation filter" and "Artist block".

2. The computer implemented method according to claim 1, wherein a configuration the is used to specify which sequence of operations is to be performed for generating a specific playlist, said operations including at least one of: "block_artist", "add_artists_of_same_broadcast_station_or_artist_recommendations_dep ending_on_source_flag", "fill_with_artist_recommendations", "fill_with_associated_artist_tracks", "fill_with_genre_tracks", "fill_with_random_broadcast_station_tracks", "mutate_and_score", "unblock_artist", "insert_artist_at_top", "insert_spoken_content" and "insert_preroll".

3. The computer implemented method according to claim 2, wherein
prior to providing the playlist to a streaming engine, displaying the playlist to the listener, who then is offered the choice to (i) skip tracks or (ii) rate tracks with "Love" and "Ban" buttons on the Internet media player device.

4. The computer implemented method according to claim 3, wherein a listener's input and his behavior with respect to tracks that are presented to him is entered into the local media encyclopedia for the respective track.

5. The computer implemented method according to claim 3, wherein a listener's input of his behavior is uploaded for being processed as an entry to the main media encyclopedia.

6. The computer implemented method according to claim 4, wherein a predetermined first number of high level classifiers are combined to a predetermined second, lower number of low level features which are stored in the local media encyclopedia.

7. The computer implemented method according to claim 6, wherein the similarity of tracks, albums and artists is calculated and stored in the master metadata encyclopedia.

8. The computer implemented method according to claim 7, wherein the rule engine is trained with editor made reference lists for each classification.

9. The computer implemented method according to claim 8, wherein the metadata generated in the listener's client device relative to each classification is fed to the master metadata encyclopedia where it is correlated with corresponding feedback from other listeners' client devices.

10. The computer it method according to claim 9, wherein the metadata includes relationship patterns between tracks in at least one of the local metadata encyclopedia and the master metadata encyclopedia, and wherein the rule engine assigns tracks with similar features to each other, and wherein the rule engine performs a rule-based analysis of the metadata to generate the playlist.

11. The computer implemented method according to claim 10, wherein the rule engine performs a rule-based analysis and assignment of listeners' inputs and behavior, and wherein the result of the rule-based analysis and assignment of at least a majority of the individual listeners is compiled and fed into the master metadata encyclopedia.

12. The computer implemented method according to claim 11, wherein the local metadata encyclopedia in the listener's client device is updated by metadata from the master metadata encyclopedia in order to receive media item similarity ratings that have been computer generated.

13. The computer implemented method according to claim 12, wherein the compilation of the similarity ratings and the listener's behavior includes processing the cumulative data in a host's online data processing center.

14. The computer implemented method according to claim 13, including the steps of (i) receiving, in the listener's client device, the similarity ratings for a plurality of the individual media items contained in a media library of the listener, and (ii) generating the media playlist including individual media items contained in the listener's media library and which have a similarity rating relative to a seed media item selected from the listener's media library.

15. The computer implemented method according to claim 14, including the steps of selecting the seed media item by manipulating a touchscreen on the listener's client device using sweeping finger gestures to scroll through a list of media items displayed on the touchscreen until a desired seed media item is displayed, and then selecting the seed media item by touching and releasing the seed media item.

16. The computer implemented method according to claim 15, including recognizing, in the rule engine, the client's device user's listening preferences and compiling playlists forming individual radio programs for each listener, wherein such playlists include music tracks, audio books, business background features, language courses, news and weather.

17. A computer implemented method for generating a media playlist including a plurality of tracks to be played on a listener's mobile or stationary client device with Internet radio capabilities, the client device intended to be connected to the Internet, the method comprising:
obtaining, as a listener's input into the listener's client device, a playlist definition;
selecting, from a plurality of tracks, tracks meeting the playlist definition to form the playlist, wherein the playlist is formed by playlist entries that include track identifications referring to selected ones of the plurality of tracks;
wherein the plurality of tracks comprises at least one of (i) tracks present in a remote master media inventory, (ii) tracks present in an Internet-based cloud memory environment, and (iii) tracks present in a local media content inventory of the listener's client device; wherein
the step of selecting tracks that meet the playlist definition includes comparing the playlist definition with entries for tracks in a metadata encyclopedia which includes metadata derived from (i) a master metadata encyclopedia referring to the tracks present in the remote master media inventory and the tracks present in the cloud memory environment, and (ii) the local media content inventory kept in the local listener's client device;

wherein the metadata encyclopedia is kept locally in the client device, and wherein each entry in the local metadata encyclopedia refers to a respective track and includes at least one track descriptor and at least one similarity data descriptor;

providing the playlist to the listener's client device for obtaining the tracks indicated on the playlist for playing the tracks in the playlist in an order defined in the playlist;

wherein a rule engine is programmed and adapted to perform filter functions for a track insertion process as tracks are added to a present playlist, where, if any particular filter function is saturated, subsequent track additions that also fall into criteria of that filter function are not inserted into the present playlist, said filter functions including at least one of: "Artist saturation filter", "Album saturation filter", "Track saturation filter" and "Artist block".

18. A computer implemented method for generating a media playlist including a plurality of tracks to be played on a listener's mobile or stationary client device with Internet radio capabilities, the client device intended to be connected to the Internet, the method comprising:

obtaining, as a listener's input into the listener's client device, a playlist definition;

selecting, from a plurality of tracks, tracks meeting the playlist definition to form the playlist, wherein the playlist is formed by playlist entries that include track identifications referring to selected ones of the plurality of tracks;

wherein the plurality of tracks comprises at least one of (i) tracks present in a remote master media inventory, (ii) tracks present in an Internet-based cloud memory environment, and (iii) tracks present in a local media content inventory of the listener's client device; wherein the step of selecting tracks that meet the playlist definition includes comparing the playlist definition with entries for tracks in a metadata encyclopedia which includes metadata derived from (i) a master metadata encyclopedia referring to the tracks present in the remote master media inventory and the tracks present in the cloud memory environment, and (ii) the local media content inventory kept in the local listener's client device;

providing the playlist to the listener's client device for obtaining the tracks Indicated on the playlist for playing the tracks hi the playlist in an order defined in the playlist;

wherein a rule engine is programmed and adapted to perform filter functions for a track insertion process as tracks are added to a present playlist, where, if any particular filter function is saturated, subsequent track additions that also fall into criteria of that filter function are not inserted into the present playlist, said filter functions including at least one of: "Artist saturation filter", "Album saturation filter", "Track saturation filter" and "Artist block".

19. The method of claim 18 wherein the metadata encyclopedia is kept locally in the client device, and wherein each entry in the local metadata encyclopedia refers to a respective track and includes at least one track descriptor.

20. The method of claim 18 wherein each entry in the metadata encyclopedia refers to a respective track and includes at least one track descriptor and at least one similarity data descriptor.

\* \* \* \* \*